United States Patent
Soderstrom (10) Patent No.: US 11,964,614 B2
(45) Date of Patent: Apr. 23, 2024

(54) OUTSIDE AUTO-DIMMING GLARE CONTROL

(71) Applicant: GENTEX CORPORATION, Zeeland, MI (US)

(72) Inventor: Joakim D. V. Soderstrom, Lund (SE)

(73) Assignee: GENTEX CORPORATION, Zeeland, MI (US)

( * ) Notice: Subject to any disclaimer, the term of this patent is extended or adjusted under 35 U.S.C. 154(b) by 0 days.

(21) Appl. No.: 17/698,043

(22) Filed: Mar. 18, 2022

(65) Prior Publication Data

US 2022/0332251 A1    Oct. 20, 2022

Related U.S. Application Data

(60) Provisional application No. 63/175,796, filed on Apr. 16, 2021.

(51) Int. Cl.
*B60R 1/08*    (2006.01)
*B60R 1/06*    (2006.01)
(Continued)

(52) U.S. Cl.
CPC ............... *B60R 1/088* (2013.01); *B60R 1/06* (2013.01); *B60R 1/12* (2013.01); *G06V 20/58* (2022.01);
(Continued)

(58) Field of Classification Search
None
See application file for complete search history.

(56) References Cited

U.S. PATENT DOCUMENTS 6,919,796 B2    7/2005 Boddy
7,543,946 B2    6/2009 Ockerse
(Continued)

FOREIGN PATENT DOCUMENTS

KR    1020190012052 A    2/2019
WO    2017191558 A1    11/2017

OTHER PUBLICATIONS

International Search Report dated Jun. 23, 2022, for corresponding PCT application PCT/US2022/020859, 4 pages.
(Continued)

*Primary Examiner* — Christopher J Kohlman
(74) *Attorney, Agent, or Firm* — Price Heneveld LLP; Brian James Brewer (57) ABSTRACT

A glare control system for a vehicle comprises a rearview assembly comprises a display element configured to display scenes exterior to the vehicle; an ambient light sensor configured to determine levels of ambient light; a blind spot module comprising at least one sensor and operable to detect other vehicles located in a field of view to the side and rear of the vehicle and in communication with the rearview assembly; an electro-optic element configured to selectively darken and clear upon receipt of appropriate instructions; and a controller in communication with the blind spot module, the ambient light sensor, and the electro-optic element, the controller configured to selectively cause the dimming of the electro-optic element. In response to the receipt of appropriate inputs from the blind spot module and the ambient light sensor, the controller is configured to transmit instructions to the electro-optic element.

15 Claims, 4 Drawing Sheets

(51) Int. Cl.
*B60R 1/12* (2006.01)
*G06V 20/58* (2022.01)
*G09G 3/20* (2006.01)

(52) U.S. Cl.
CPC ........ *G09G 3/20* (2013.01); *B60R 2001/1223* (2013.01); *G09G 2360/144* (2013.01); *G09G 2380/10* (2013.01)

(56) References Cited

U.S. PATENT DOCUMENTS

| | | |
|---|---|---|
| 10,821,901 B2 | 11/2020 | DuBridge |
| 10,843,629 B2 | 11/2020 | Kim et al. |
| 2006/0006988 A1* | 1/2006 | Harter, Jr. .............. B60Q 9/008 348/148 |
| 2010/0182143 A1* | 7/2010 | Lynam .................. B60R 1/1207 340/465 |
| 2012/0099173 A1* | 4/2012 | Gentry ...................... B60R 1/06 428/80 |
| 2016/0023607 A1 | 1/2016 | Soderstrom |
| 2018/0201192 A1* | 7/2018 | Ishida ....................... B60R 1/08 |
| 2019/0031106 A1 | 1/2019 | Foote et al. |
| 2020/0172015 A1 | 6/2020 | Baird |

OTHER PUBLICATIONS

Written Opinion dated Jun. 23, 2022, for corresponding PCT application No. PCT/US2022/020859, 6 pages.

* cited by examiner

OUTSIDE AUTO-DIMMING GLARE CONTROL

CROSS REFERENCE TO RELATED APPLICATIONS

This application claims the benefit of and priority to U.S. Provisional Patent Application No. 63/175,796, filed on Apr. 16, 2021, entitled Outside Auto-Dimming Glare Control, the entire disclosure of which is hereby incorporated herein by reference.

FIELD OF THE DISCLOSURE

This disclosure relates generally to reducing glare levels in rearview assemblies, and in particular, to reducing glare levels in rearview mirror assemblies located on the exterior of a vehicle.

BACKGROUND

Exterior rearview mirror assemblies may be mounted on the exterior of a vehicle and designed to provide views of scenes generally to the rear of the vehicle. Headlights of vehicles approaching from the rear of the vehicle may cause glare on the mirror of the exterior rearview assemblies. For this reason, some mirrors may comprise an electro-optic element capable of darkening to reduce glare.

The exterior rearview mirror assemblies may be in communication with an interior rearview assembly. The interior rearview assembly may be configured to reflect images received through the rearview window of the vehicle. The interior rearview assembly may have a sensor to detect glare hitting the mirror. Upon the sensor detecting glare, a controller may cause the electro-optic elements in both the exterior rearview mirror assembly and the interior mirror assembly to darken, thereby reducing the glare in the mirrors. However, in some vehicles, there are no rear windows or the rear windows may be obscured. In these situations, it may be desirable to find another way to sense when to darken the electro-optic element on the exterior mirrors to reduce glare. Some rearview assemblies may use a computationally complex option using a rear-facing camera to allow appropriate darkening of the electro-optic element on the exterior vehicular mirrors, but this option may be costly and complicated to implement.

SUMMARY

According to an aspect, a glare control system for a vehicle may comprise a rearview assembly having a display element configured to display scenes exterior to the vehicle; an ambient light sensor configured to determine levels of ambient light, a blind spot module comprising at least one sensor and operable to detect other vehicles located in a field of view exterior to and to the side and rear of the vehicle; an electro-optic element associated with the display element and configured to selectively darken and clear upon the receipt of appropriate instructions; and a controller in communication with the blind spot module, the ambient light sensor, and the electro-optic element. In response to the receipt of appropriate inputs from the blind spot module and the ambient light sensor, the controller may be configured to transmit instructions to the electro-optic element. The controller may further be configured to, upon the receipt of the instructions, selectively cause the dimming of the electro-optic element.

The controller may be configured to transmit instructions to cause the dimming of the electro-optic element upon receipt of inputs indicating the ambient light levels may be below a predetermined level and there may be an object in the field of view of the blind spot module. The controller may be configured to transmit instructions to cause the clearing of the electro-optic element upon receipt of an input indicating the ambient light levels may be above a predetermined level. The controller may be configured to transmit instructions to cause the clearing of the electro-optic element upon receipt of an input indicating there may be no object in the field of view of the blind spot module.

The sensor of the blind spot module may comprise one of a lidar, a sonar, or a radar sensor. The sensor of the blind spot module may comprise an imager. The sensor of the blind spot module may comprise an imager and a sensor that uses one of radar, lidar, and sonar technologies.

According to another aspect, a glare control system may comprise a first rearview assembly disposed on an exterior of a vehicle and having a first display element configured to reflect images of scenes exterior to the vehicle; a first ambient light sensor configured to determine levels of ambient light; a first blind spot module comprising at least one sensor and operable to detect other vehicles located in a first field of view exterior to and to the side and rear of the vehicle; a first electro-optic element associated with the first display element and configured to selectively darken and clear upon the receipt of appropriate instructions; a second rearview assembly disposed on an exterior of a vehicle and having a second display element configured to reflect images of scenes exterior to the vehicle; a second ambient light sensor configured to determine levels of ambient light; a second blind spot module comprising at least one sensor and operable to detect other vehicles located in a second field of view exterior to and to the side and rear of the vehicle; a second electro-optic element associated with the second display element and configured to selectively darken and clear upon the receipt of appropriate instructions; and a controller in communication with the first blind spot module, the first ambient light sensor, the first electro-optic element, the second blind spot module, the second ambient light sensor, and the second electro-optic element, the controller configured to selectively cause the dimming of the first electro-optic element based on inputs received from the first blind spot module and the first ambient light sensor and to selectively cause the dimming of the second electro-optic element based on inputs received from the second blind spot module and the second ambient light sensor. In response to the receipt of appropriate inputs from the first blind spot module and the first ambient light sensor, the first controller may be configured to transmit instructions to the first electro-optic element. In response to the receipt of appropriate inputs from the second blind spot module and the second ambient light sensor, the second controller may be configured to transmit instructions to the second electro-optic element.

According to another aspect, a rearview assembly for a vehicle may comprise: a display element capable of displaying images of a scene exterior to the vehicle; an ambient light sensor; a blind spot module comprising a sensor; and an electro-optic element associated with the display element; a controller configured to receive inputs from the ambient light sensor and the blind spot module. In response to the receipt of appropriate inputs from the blind spot module and the ambient light sensor, the controller may be configured to transmit instructions to the electro-optic element.

The particular input from the ambient light sensor may comprise an indication that ambient light levels may be below a predetermined level. The particular input from the blind spot module may comprise an indication that a vehicle may be in the field of view of the blind spot module.

The sensor of the blind spot module may comprise one of a lidar, a sonar, or a radar sensor. The sensor of the blind spot module may comprise an imager. The sensor of the blind spot module may comprise an imager and a sensor that uses one of radar, lidar, and sonar technologies.

DETAILED DESCRIPTION

Figure 1:
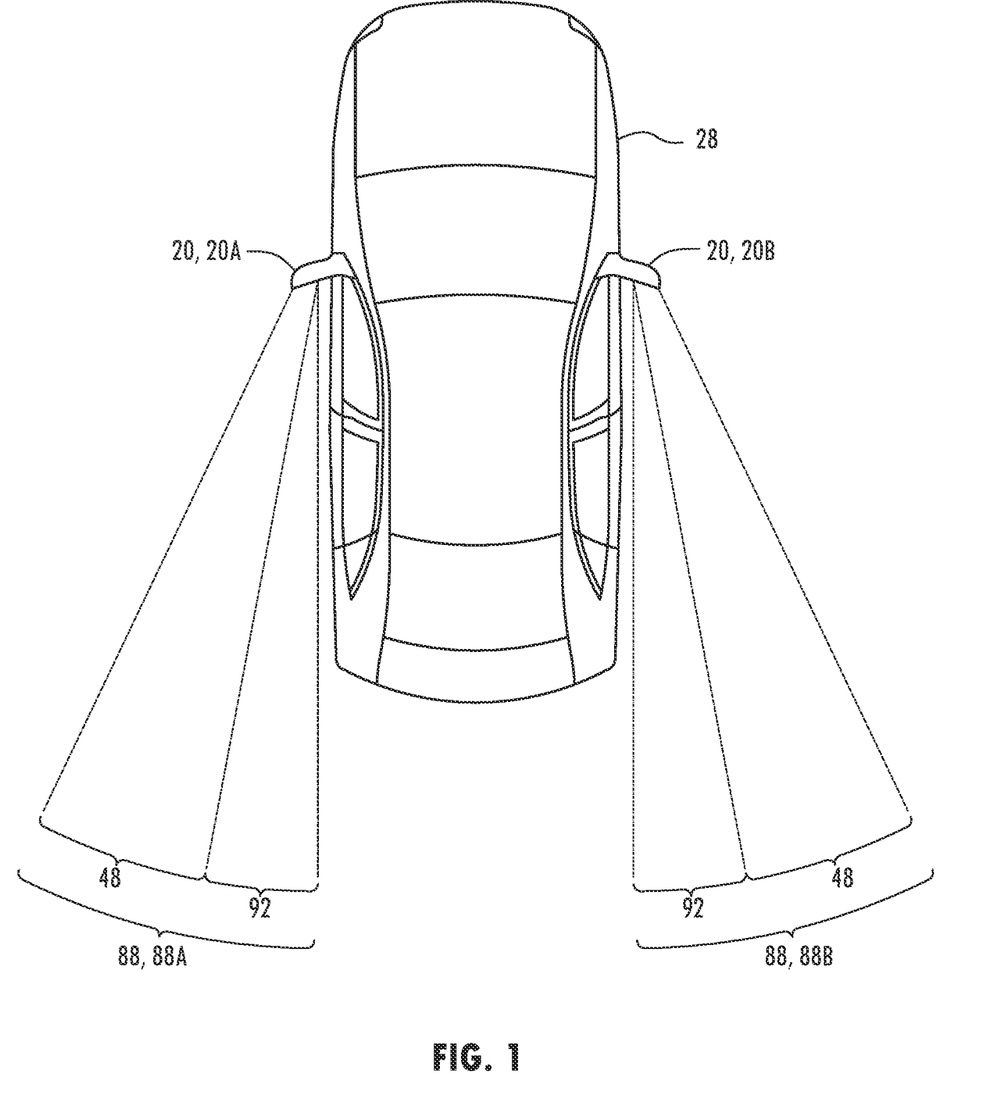
FIG. 1 illustrates a vehicle having a system for automatically dimming exterior rearview assemblies of vehicles in accordance with this disclosure.
Figure 2A:
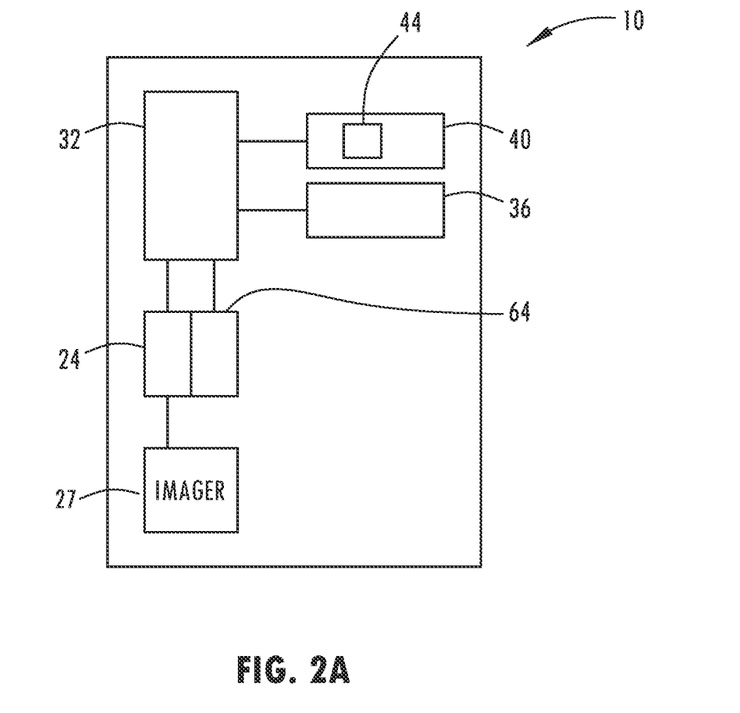
FIG. 2A illustrates a block diagram of a first embodiment of the system of FIG. 1.
Figure 2B:
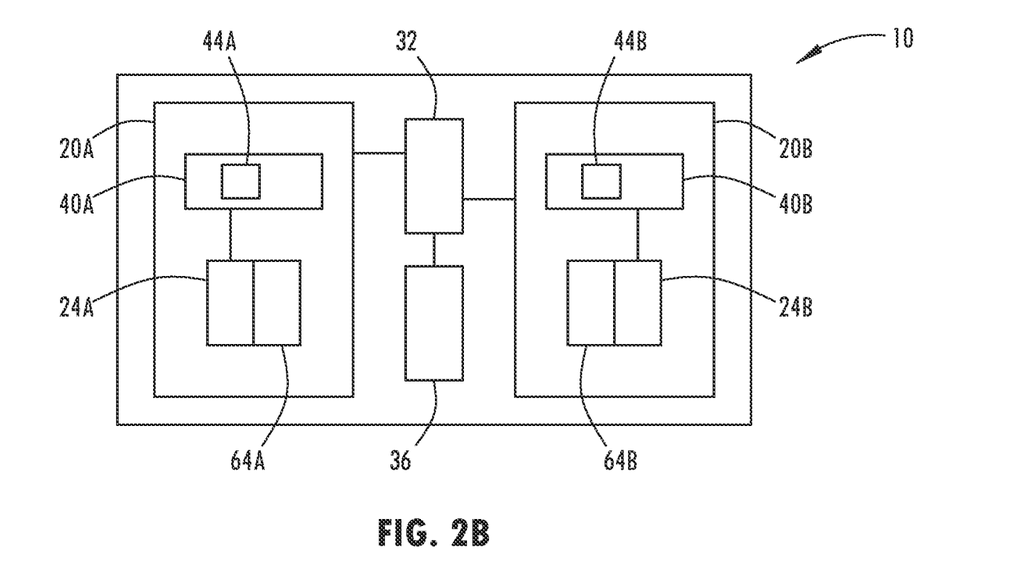
FIG. 2B illustrates a block diagram of a second embodiment of the system of FIG. 1.

Referring to FIGS. 1, 2A, and 2B, a glare control system for an exterior rearview assembly of a vehicle is generally indicated at 10. Glare control system 10 may be capable of automatically reducing glare in exterior rearview assembly 20. Glare control system 10 may comprise a controller 32, an ambient light sensor 36, and at least one blind spot module 40 having at least one sensor 44. Sensor 44 of blind spot module 40 may be configured to detect the presence of an object proximate to the vehicle in a blind spot that the driver of the vehicle cannot see.

Figure 3:
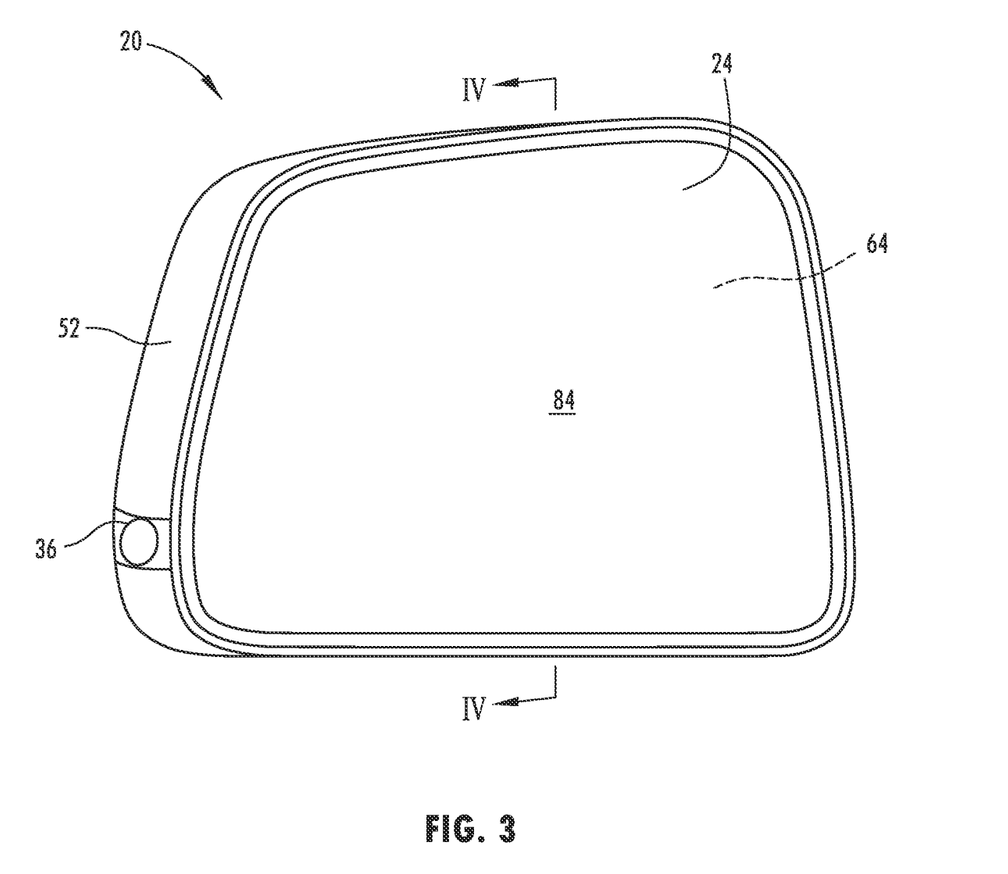
FIG. 3 illustrates a front elevational view of an exterior rearview assembly in accordance with this disclosure.

Using existing blind spot modules 40 and ambient light sensors 36 may provide a low-cost option for glare control, and may reduce the amount of components being housed in housing 52 of exterior rearview assembly 20.

Exterior rearview assembly 20 may comprise a display element 24 capable of displaying scenes from the exterior of the vehicle 28. Exterior rearview assembly 20 may be configured to be secured to an exterior surface of a side of vehicle 28. The vehicle may be a truck, car, motorcycle, and the like. As shown, vehicle 28 may have two exterior rearview assemblies. one on a right side of vehicle 28 and one on a left side of vehicle 28 but more or fewer exterior rearview assemblies may be used and still be within the scope of this disclosure. Each exterior rearview assembly 20 may be associated with a glare control system 10. Each exterior rearview assembly 20 may have a first field of view 48 exterior to vehicle 28 and may be configured to capture and/or display images of scenes within the first field of view 48. First field of view 48 may be generally rearward of exterior rearview assembly 20 and may extend from a substantially lateral position next to vehicle 28 to a rearward position behind and at least partially lateral to vehicle 28.

Figure 4:
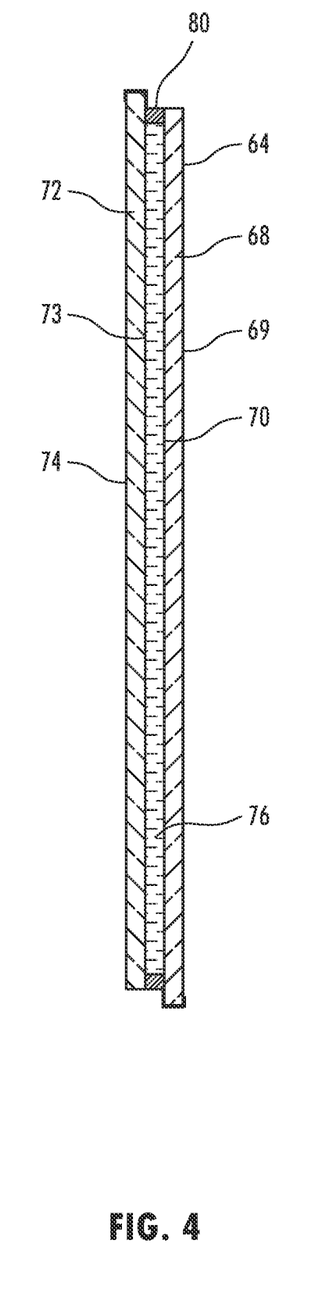
FIG. 4 illustrates a side cross-sectional view of an electro-optic element of the exterior rearview assembly of FIG. 3 along line III-III in accordance with this disclosure.

Referring now to FIG. 3, each exterior rearview assembly 20 may include a housing 52 that may be configured to support and protect display element 24. Display element 24 may comprise an at least partially reflective partially transmissive element 64 capable of selective darkening and clearing, such as an electro-optic element. With reference now to FIG. 4, the electro-optic element 64 may include first and second substrates 68, 72, respectively. First and second substrates 68, 72 may be made of glass, a polymeric material, or any other material known in the art. First substrate 68 may define a first surface 69 and a second surface 70 and second substrate 72 may define a third surface 73 and a fourth surface 74. An electro-optic medium 76 may be disposed between first substrate 68 and second substrate 72. A seal 80 may extend between first substrate 68 and second substrate 72. Electro-optic medium 76 may be sealed between seal 80 and first and second substrates 68, 72. A reflective coating may be disposed on third surface 73 or fourth surface 74. Reflective coating may be configured to provide a reflection of the area behind vehicle 28 within the first field of view 48 to a driver. Electro-optic element 64 may be capable of selectively darkening or clearing. When electro-optic element 64 darkens, it may reduce the appearance of glare on display element.

In some embodiments, display element 24 may additionally, or alternatively, include a display portion 84 that shows image data captured by an imager 27 located in or on vehicle 28 or exterior rearview assembly 20. In some embodiments, imager 27 may be configured to capture image data from scenes in the first field of view 48. The image data may be processed by a processor (not shown) and the images displayed on display portion 84 of exterior rearview assembly 20. Display portion 84 may be used instead of or in addition to electro-optic element 64. Display portion 84 may have a display area generally equivalent to the size and shape of the reflective coating present on third surface 73 or fourth surface 74 of second substrate 72.

The scenes displayed on the at least one exterior rearview assembly 20 may be within first field of view 48 of the exterior rearview assembly 20. The captured scenes may include scenes to the side of the vehicle 28 on which the exterior rearview assembly 20 is positioned. For example, an exterior rearview assembly 20 positioned on a driver's side of vehicle 28 may capture scenes behind and to the driver's side of vehicle 28. Similarly, an exterior rearview assembly 20 positioned on a passenger side of vehicle 28 may capture scenes from behind and to the passenger side of vehicle 28.

Each exterior rearview assembly 20 may be associated with a blind spot module 40. Blind spot module 40 may be similar to those described in commonly-assigned U.S. Pat. No. 10,821,901 filed on Mar. 21, 2019, entitled "Blind Spot Module with Off Indicator" by Todd M. DuBridge, et al., and in commonly-assigned U.S. Pat. No. 7,543,946, filed on Apr. 28, 2004, entitled "Dimmable Rearview Assembly having a Glare Sensor" by Harold C. Ockerse, et al., the entire disclosures of which are hereby incorporated by reference.

Each blind spot module 40 may comprise at least one sensor 44. In some embodiments, sensor 44 of blind spot module 40 may comprise a camera or imager 27. In some embodiments, sensor 44 of blind spot module 40 may use lidar, radar, or sonar technologies. In some embodiments, the at least one sensor 44 may comprise a first sensor that comprises an imager and a second sensor that uses one of lidar, radar, and sonar technologies. The at least one sensor 44 of blind spot module 40 may be positioned in various locations in or on vehicle 28 and/or exterior rearview assembly 20.

Sensor 44 of each blind spot module 40 may have a second field of view 88. Second field of view may at least partially coincide with first field of view 48 and may be generally to a side of vehicle 28 and rearward of the driver. Second field of view 88 may partially or completely encompass at least a portion of first field of view 48 and may partially or completely encompass at least a portion of a blind spot 92 adjacent to vehicle 28. Blind spot 92 may be to the rear of a driver of vehicle 28 and rearward of exterior rearview assembly 20 of vehicle 28. The at least one sensor 44 of blind spot module 40 may be configured to detect objects that are within a predetermined distance of vehicle 28 and within second field of view 48. In some embodiments, sensor 44 of blind spot module 40 may be an imager 27 that captures image data and presents the image data on display portion 84 of display element 24. Blind spot module 40 may be configured to determine whether a vehicle or other object is in second field of view 88 based, at least in part, on objects sensed by the at least one sensor 44 of blind spot module 40.

Each blind spot module 40 may be in communication with electro-optic element 64 of the associated exterior rearview assembly 20. Blind spot module 40 may also be in communication with controller 32 and may be configured to transmit an input to controller 32 regarding the presence of an object in first field of view 48.

In some embodiments, sensor 44 of blind spot module 40 may be positioned behind electro-optic element 64. Display element 24 may include display portion 84 and electro-optic element 64. A reflective coating on third surface 73 and/or fourth surface 74 of electro-optic element 64 may provide a reflection of a scene to the rear of vehicle 28 when display portion 84 is not activated.

Sensor 44 of blind spot module 40 may be configured to detect the presence of an object proximate to the vehicle in blind spot 92. When an object (such as a trailing vehicle) is in blind spot 92, the object may not be visible on the reflective surface of the electro-optic element 64 or on the display portion 84 (if the exterior rearview assembly 20 includes a display portion 84). Accordingly, sensor 44 of blind spot module 40 may be positioned on or in exterior rearview assembly 20 to capture object data from blind spot 92. Sensor 44 may be configured to capture data from blind spot 92 of vehicle 28.

Exterior rearview assembly 20 may be configured to provide an image to a user of an area rearward of vehicle 28. The image may be a reflection provided by a reflective surface of an electro-optic assembly, for example, or may be image data provided on display portion 84 wherein the image data is captured by an imager 27 in or on vehicle 28 or in or on exterior rearview assembly 20. While an object is in blind spot, blind spot monitor 40 may cause a blind spot warning indicator (not shown) to illuminate, thereby indicating to the driver that an object is in blind spot 92 of vehicle 28.

Inputs from blind spot modules 40 regarding the presence or absence of an object, such as a vehicle, in one of the blind spots 92 may be used as a proxy for inputs received from a rear-facing camera regarding the presence or absence of a vehicle in blind spot 92. This may allow for a simpler and less costly solution to controlling glare in exterior rearview assemblies, especially those rearview assemblies that are configured to automatically dim to reduce glare from approaching vehicles. Furthermore, since the blind spot modules may be activated not only when a vehicle is approaching from behind but also when passing another vehicle, it may provide glare control when passing vehicles.

Controller 32 of glare control system 10 may be in communication with sensor 44 of blind spot module and with electro-optic element 64. Controller 32 may be configured to control electro-optic element 64, causing it to darken or clear based, at least in part, on inputs received from sensor 44 of blind spot module 40 and from ambient light sensor 36.

Ambient light sensor 36 may be configured to sense ambient light levels. Ambient light sensor 36 may be in communication with controller 32 and may communicate ambient light levels to controller 32. Controller 32 may use information on ambient light levels as a factor in determining whether to cause electro-optic element 64 to darken or clear.

Using inputs from ambient light sensor 36, ambient or outside light conditions may be determined. Based on the determination of outside light conditions, it can be determined whether it may be desirable to darken rearview assembly 20 to control glare. For example, if ambient light sensor 36 indicates that ambient light levels are high, it can be assumed that other vehicles may not be using headlights or, if they are using headlights, it won't cause problematic levels of glare in exterior rearview assemblies 20 as the ambient light may mitigate the effects of the glare on the driver. Accordingly, when there are sufficient levels of ambient light, it may not be necessary to darken electro-optic element 64 to reduce glare on exterior rearview assembly 20, and no action may be taken by glare control system 10. However, if ambient light sensor 36 indicates that ambient light levels are low, such as at dusk or night, it can be assumed that other vehicles may be using headlights and the headlights may cause glare in rearview assembly 20. In that case, glare control system 10 may cause the darkening of electro-optic element 64 upon the receipt of inputs indicating an object in second field of view 88.

For example, when ambient light levels are sufficiently high, such as during the day, if a vehicle is detected in first field of view 48, ambient light sensor 36 may indicate to controller 32 that there is sufficient ambient light, and controller 32 may not cause electro-optic element 64 to darken. Similarly, if a vehicle is detected in first field of view 48 when levels of ambient light are low such as at night, ambient light sensor 36 may indicate to controller 32 that there is not a lot of ambient light. In this circumstance, controller 32 may direct electro-optic element 64 to darken to reduce glare on exterior rearview assembly 20.

In some embodiments, as shown in FIG. 2A, vehicle 28 may have an exterior rearview assembly 20 on each side of vehicle 28, as discussed previously. Each exterior rearview assembly 20 may have its own blind spot sensor 44 and controller 32, and electro-optic element 64 of each exterior rearview assembly 20 may be controlled separately. Thus, if an object is in second field of view 88A of a first exterior rearview assembly 20A but there is not an object in the second field of view 88B of a second exterior rearview assembly 20B, only the electro-optic element 64A of first exterior rearview assembly 20A may darken. In some embodiments, each exterior rearview assembly 20A, 20B may have its own ambient light sensor 36, as shown in FIG. 2A. Additionally, or alternatively, each exterior rearview assembly 20A, 20B may be in communication with a common ambient light sensor 36 as shown in FIG. 2B. In some embodiments, each controller 32 may be in communication with a single ambient light sensor 36.

In some embodiments, as shown in FIG. 2B, a single controller 32 may be configured to receive inputs from at least one of sensor 44A of blind spot module 40A on a first side of vehicle 28 and sensor 44B of blind spot module 40B on a second side of vehicle 28. Controller 32 may additionally be configured to receive inputs from ambient light sensor 36. Upon receipt of an input from, for example, a first blind spot module 40A in first exterior rearview assembly 20A indicating that there is an object in the first field of view 48A, controller 32 may be configured to determine whether there is sufficient ambient light to mitigate glare from any oncoming headlights. Controller 32 may determine this based, at least in part, on an input from ambient light sensor 36. Upon a determination that the ambient light levels are below a first predetermined light level, controller 32 may then cause the activation of the electro-optic element 64A for first exterior rearview assembly 20A. Electro-optic element 64A for first exterior rearview assembly 20A may then darken to reduce glare in first exterior rearview assembly 20A. If, however, controller 32 determines that the ambient light levels are above a second predetermined light level, controller may not cause electro-optic element 64A to darken regardless of whether an input is received from one of sensor 44A and 44B indicating the presence of an object in one of blind spots 40A, 40B. First predetermined light level may be lower than or the same as second predetermined light level.

Upon the receipt of an input from blind spot module 40 that there is an object in the one of the first and the second fields of view and an input from ambient light sensor 36 that indicates that the ambient light level is below a predetermined level, controller 32 may be configured to cause electro-optic element 64 to darken, thereby reducing any glare that the lights from the other vehicle may cause. However, upon receipt of inputs indicating that there is an object in one of the first and second fields of view 48, 88 and the ambient light levels are above a predetermined level, there may be sufficient ambient light to mitigate any glare from oncoming headlights, and controller 32 may be configured to not activate electro-optic element 64. Similarly, upon the receipt of inputs indicating low levels of ambient light but in the absence of inputs indicating the presence of an object in first and second fields of view 48, 88, electro-optic element 64 may not be activated.

Sensor 44 in blind spot module 40 may be activated not only by the presence of a vehicle that is seen approaching from the rear but also when passing another vehicle. Controlling the darkening of electro-optic element 64 by using inputs from blind spot module 40 may offer improved glare control in both situations. Using blind spot modules 40 in glare control system 10 and triggering the darkening of electro-optic element 64 to reduce glare based on the presence of an object in the second field of view 88 may allow for the reduction of glare caused by vehicles that are being passed by the subject vehicle 28. The system described herein may also allow electro-optic element 64 of exterior rearview assembly 20 to darken, thereby providing glare reduction for vehicles 28 that initially appear in a blind spot of exterior rearview assembly 20. Similar to the above, dimming the glare control system 10 in response to the presence of vehicles in a blind spot may also allow for the reduction of glare caused initially upon the other vehicle exiting blind spot of exterior rearview assembly 20 into the first field of view 48 by preemptively darkening electro-optic element 64.

In some embodiments, sensor 44 of blind spot module 40 may be positioned in an upper corner of the exterior rearview assembly 20 closest to vehicle 28. In this position, sensor 44 of blind spot module 40 may have a sufficient field of view to collect relevant image data that relates to other vehicles or objects that may be present in blind spot of vehicle 28.

In some embodiments, the at least partially transmissive portion of electro-optic element 64 may define a clear or partially clear window (not shown), and sensor 44 of blind spot module 40 may be positioned behind the window. In this location, sensor 44 of blind spot module 40 may project through a portion of electro-optic element 64.

The above description is considered that of the preferred embodiments only. Modifications of the disclosure will occur to those skilled in the art and to those who make or use the disclosure. Therefore, it is understood that the embodiments shown in the drawings and described above are merely for illustrative purposes and not intended to limit the scope of the disclosure, which is defined by the following claims as interpreted according to the principles of patent law, including the doctrine of equivalents. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts, or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

In this document, relational terms, such as first and second, top and bottom, front and back, left and right, vertical, horizontal, and the like, are used solely to distinguish one entity or action from another entity or action, without necessarily requiring or implying any actual such relationship, order, or number of such entities or actions. These terms are not meant to limit the element which they describe, as the various elements may be oriented differently in various applications. Furthermore, it is to be understood that the device may assume various orientations and step sequences, except where expressly specified to the contrary. It is also to be understood that the specific devices and processes illustrated in the attached drawings and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

It will be understood that any described processes or steps within described processes may be combined with other disclosed processes or steps to form structures within the scope of the present disclosure. The exemplary processes disclosed herein are for illustrative purposes and are not to be construed as limiting. It is also to be understood that variations and modifications can be made on the aforementioned methods without departing from the concepts of the present disclosure, and further it is to be understood that such concepts are intended to be covered by the following claims unless these claims by their language expressly state otherwise.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within at least one of 2% of each other, 5% of each other, and 10% of each other.

The invention claimed is:

1. A glare control system, comprising:
    a rearview assembly disposed on an exterior of a vehicle and having a display element configured to reflect images of scenes exterior to the vehicle;
    an ambient light sensor configured to determine levels of ambient light;
    a blind spot module comprising at least one sensor and operable to detect other vehicles located in a field of view exterior to and to the side and rear of the vehicle;
    an electro-optic element associated with the display element and configured to selectively darken and clear upon the receipt of appropriate instructions, wherein the electro-optic element is free of a glare sensor; and
    a controller in communication with the blind spot module, the ambient light sensor, and the electro-optic element;
    wherein, in response to the receipt of appropriate inputs from the blind spot module and the ambient light sensor, the controller is configured to transmit instructions to the electro-optic element;
    wherein the appropriate inputs include inputs indicating that ambient light levels are low and that a vehicle has been detected by the blind spot monitor; and
    wherein the controller is configured to, upon the receipt of the instructions, selectively cause the dimming of the electro-optic element.

2. The glare control system of claim 1, wherein the controller is configured to transmit instructions to cause the dimming of the electro-optic element upon receipt of inputs indicating the ambient light levels are below a predetermined level and there is an object in the field of view of the blind spot module.

3. The glare control system of claim 1, wherein the controller is configured to transmit instructions to cause the clearing of the electro-optic element upon receipt of an input indicating the ambient light levels are above a predetermined level.

4. The glare control system of claim 1, wherein the controller is configured to transmit instructions to cause the clearing of the electro-optic element upon receipt of an input indicating there is no object in the field of view of the blind spot module.

5. The glare control system of claim 1, wherein the sensor of the blind spot module comprises one of a lidar, a sonar, or a radar sensor.

6. The glare control system of claim 1, wherein the sensor of the blind spot module comprises an imager.

7. The glare control system of claim 1, wherein the sensor of the blind spot module comprises an imager and a sensor that uses one of radar, lidar, and sonar technologies.

8. A glare control system, comprising a first rearview assembly disposed on an exterior of a vehicle and having a first display element configured to reflect images of scenes exterior to the vehicle;
    a first ambient light sensor configured to determine levels of ambient light;
    a first blind spot module comprising at least one sensor and operable to detect other vehicles located in a first field of view exterior to and to the side and rear of the vehicle;
    a first electro-optic element associated with the first display element and configured to selectively darken and clear upon the receipt of appropriate instructions;
    a second rearview assembly disposed on an exterior of a vehicle and having a second display element configured to reflect images of scenes exterior to the vehicle;
    a second ambient light sensor configured to determine levels of ambient light;
    a second blind spot module comprising at least one sensor and operable to detect other vehicles located in a second field of view exterior to and to the side and rear of the vehicle;
    a second electro-optic element associated with the second display element and configured to selectively darken and clear upon the receipt of appropriate instructions; and
    a controller in communication with the first blind spot module, the first ambient light sensor, the first electro-optic element, the second blind spot module, the second ambient light sensor, and the second electro-optic element, the controller configured to selectively cause the dimming of the first electro-optic element based on inputs received from the first blind spot module and the first ambient light sensor and to selectively cause the dimming of the second electro-optic element based on inputs received from the second blind spot module and the second ambient light sensor;
    wherein, in response to the receipt of appropriate inputs from the first blind spot module and the first ambient light sensor, the first controller is configured to transmit instructions to the first electro-optic element;
    wherein the appropriate inputs include inputs indicating that ambient light levels are low and that a vehicle has been detected by the blind spot monitor; and
    wherein, in response to the receipt of appropriate inputs from the second blind spot module and the second ambient light sensor, the second controller is configured to transmit instructions to the second electro-optic element.

9. A rearview assembly for a vehicle, comprising:
a display element capable of displaying images of a scene exterior to the vehicle;
an ambient light sensor;
an electro-optic element associated with the display element and configured to selectively darken and clear upon the receipt of appropriate instructions;
a blind spot module comprising a sensor positioned behind the electro-optic element; and
a controller configured to receive inputs from the ambient light sensor and the blind spot module;
wherein the controller is configured to transmit instructions to the electro-optic element in response to the receipt of particular inputs from the ambient light sensor and the blind spot module; and
wherein the particular inputs include inputs indicating that ambient light levels are low and that a vehicle has been detected by the blind spot monitor.

10. The rearview assembly of claim 9, wherein the controller is configured to transmit instructions to cause the dimming of the electro-optic element upon receipt of inputs indicating the ambient light levels are below a predetermined level and there is an object in the field of view of the blind spot module.

11. The glare control system of claim 9, wherein the controller is configured to transmit instructions to cause the clearing of the electro-optic element upon receipt of inputs indicating the ambient light levels are above a predetermined level.

12. The glare control system of claim 9, wherein the controller is configured to transmit instructions to cause the clearing of the electro-optic element upon receipt of inputs indicating there is no object in the field of view of the blind spot module.

13. The glare control system of claim 9, wherein the sensor of the blind spot module comprises one of a lidar, a sonar, or a radar sensor.

14. The glare control system of claim 9, wherein the sensor of the blind spot module comprises an imager.

15. The glare control system of claim 9, wherein the sensor of the blind spot module comprises an imager and a sensor that uses one of radar, lidar, and sonar technologies.

* * * * *